US012129042B2

United States Patent
Guillois et al.

(10) Patent No.: US 12,129,042 B2
(45) Date of Patent: Oct. 29, 2024

(54) ACOUSTIC SEALING ELEMENT

(71) Applicant: SAFRAN NACELLES, Gonfreville-l'Orcher (FR)

(72) Inventors: Denis Guillois, Moissy-Cramayel (FR); Loïc Chapelain, Moissy-Cramayel (FR); Marc Versaevel, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 18/292,765

(22) PCT Filed: Jul. 22, 2022

(86) PCT No.: PCT/FR2022/051470
§ 371 (c)(1),
(2) Date: Jan. 26, 2024

(87) PCT Pub. No.: WO2023/007077
PCT Pub. Date: Feb. 2, 2023

(65) Prior Publication Data
US 2024/0262522 A1 Aug. 8, 2024

(30) Foreign Application Priority Data

Jul. 29, 2021 (FR) ...................................... 2108252

(51) Int. Cl.
*B64D 33/02* (2006.01)
*F02C 7/24* (2006.01)

(52) U.S. Cl.
CPC ...... *B64D 33/02* (2013.01); *B64D 2033/0206* (2013.01); *F02C 7/24* (2013.01); *F05D 2260/96* (2013.01)

(58) Field of Classification Search
CPC .... B64F 33/02; B64D 2033/0206; F02C 7/24; F05D 2260/96
See application file for complete search history.

(56) References Cited

U.S. PATENT DOCUMENTS 4,449,607 A * 5/1984 Forestier ................. F02K 1/827
428/116
5,306,881 A * 4/1994 Kiyooka ............. F01N 13/1805
181/227

(Continued)

FOREIGN PATENT DOCUMENTS

EP 3696090 A1 * 8/2020 ............... B64C 1/40
EP 3779961 A1 2/2021

(Continued)

OTHER PUBLICATIONS

Search Report and Written Opinion issued in International Application No. PCT/FR2022/051470, mailed on Feb. 2, 2023.

(Continued)

*Primary Examiner* — Forrest M Phillips
(74) *Attorney, Agent, or Firm* — Bookoff McAndrews, PLLC (57) ABSTRACT

An acoustic assembly including a multicellular acoustic panel having at least one through cavity along a direction X, wherein the acoustic assembly further includes at least one sealing element including a body enclosing one or more acoustic cells, the body being able to be inserted into the cavity and extending along the direction X between a first face and a second face, the sealing element further including a seal on the second face of the body able to ensure the sealing with the acoustic panel.

14 Claims, 9 Drawing Sheets

(56) References Cited

U.S. PATENT DOCUMENTS

| | | | |
|---|---|---|---|
| 5,912,442 A | 6/1999 | Nye et al. | |
| 9,659,556 B1* | 5/2017 | Pierce | G10K 11/172 |
| 11,339,720 B2* | 5/2022 | Van Ness | F04D 29/665 |
| 2008/0308345 A1* | 12/2008 | Borchers | F01D 25/30 |
| | | | 181/222 |
| 2015/0027629 A1* | 1/2015 | Butler | G10K 11/168 |
| | | | 156/306.6 |
| 2015/0041248 A1* | 2/2015 | Ichihashi | F02C 7/24 |
| | | | 29/896.2 |
| 2017/0292453 A1 | 10/2017 | Rami et al. | |
| 2020/0165975 A1* | 5/2020 | Brochard | G10K 11/168 |
| 2020/0265821 A1* | 8/2020 | Riccobene | B29C 39/026 |

FOREIGN PATENT DOCUMENTS

| | | |
|---|---|---|
| FR | 3055662 A1 | 3/2018 |
| GB | 2314526 A | 1/1998 |

OTHER PUBLICATIONS

Search Report issued in French Application No. 2108252, mailed Mar. 31, 2022.

\* cited by examiner

ACOUSTIC SEALING ELEMENT

CROSS-REFERENCE TO RELATED APPLICATIONS

This is a National Stage Application under 35 U.S.C. § 371 of International Application No. PCT/FR2022/051470, filed Jul. 22, 2022, now published as WO 2023/0070077 A1, which claims priority to French Patent Application No. 21 08252, filed on Jul. 29, 2021.

TECHNICAL FIELD

This invention relates to the general field of acoustic attenuation structures. It more specifically relates to acoustic panels used in airplane engines such as in gas turbines and other turbomachines, particularly to reduce the noise generated by the fan or by the expulsion of the gas at the exhaust.

PRIOR ART

Figure 1:
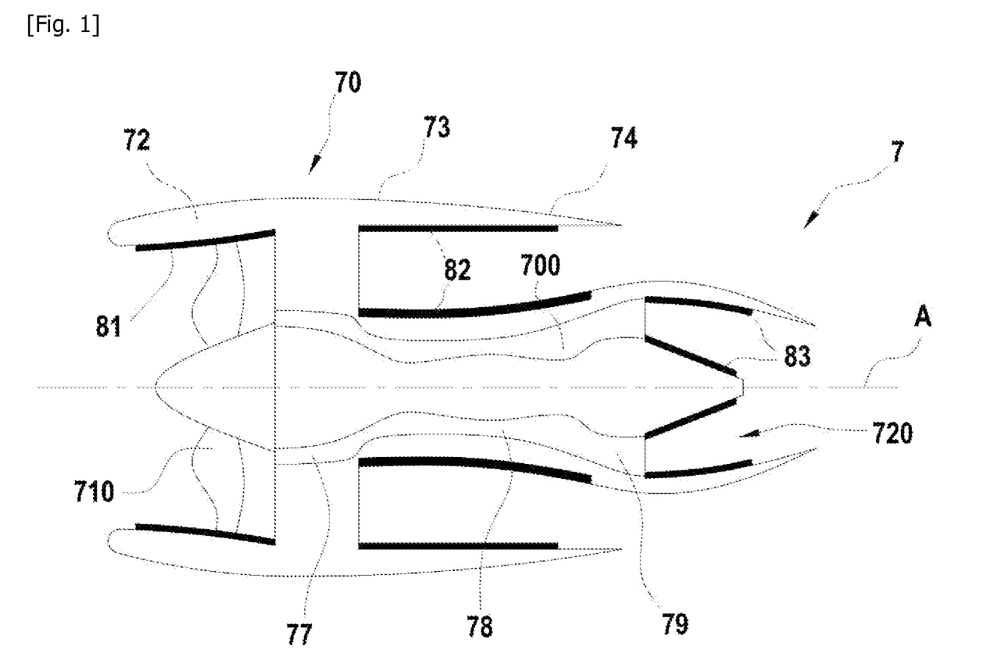
FIG. 1 is a schematic section view illustrating a propulsive assembly of the prior art comprising acoustic panels.

FIG. 1 is an illustration of a propulsive assembly 7 extending along a longitudinal axis A comprising a short nacelle 70 and a turbojet engine 700. The turbomachine particularly comprises a compressor 77, a combustion chamber 78 and a turbine 79. The nacelle 70 has a structure comprising an upstream section forming an air inlet 72, a median section 73 and a downstream section 74 comprising a thrust reverser. The median section 73 comprises fan cowls intended to surround a fan 710 of the turbojet engine 700. The downstream section 74 is intended to surround the combustion chamber 78 of the turbojet engine and an exhaust nozzle 720.

Acoustic panels 81 can be disposed on the inner face of the air inlet 72 located facing the fan 710 to reduce the noise generated by said fan 710. Acoustic panels 82 can be disposed on the inner face of the downstream section 74, at the thrust reversers, or on the outer face of the turbojet engine 700 which comprises the combustion chamber 78. Furthermore, acoustic panels 83 may be disposed at the nozzle 720, to reduce the noise generated by the expulsion of the gas at the exhaust.

The acoustic panels are typically composed of an acoustic surface plate or skin permeable to the acoustic waves that one wishes to attenuate and a fully reflective plate or skin known as the "closing plate", a cellular body being disposed between these two walls. The cellular body is generally composed of a set of partitions, for example in a honeycomb shape. In a well-known manner, such structures form Helmholtz-type resonators, which make it possible to attenuate acoustic waves within a certain range of frequencies. Acoustic panels of this type are in particular described in the documents U.S. Pat. No. 5,912,442 and GB 2 314 526.

The acoustic panels can be endowed with openings or through cavities, allowing access to elements located behind the panel. For example, an acoustic panel can be disposed near the surface of a structure which comprises attaching screws, to which it is necessary to regularly have access.

These openings or through cavities lead to a substantial reduction in the acoustic treatment provided by the acoustic panel. On the one hand, the presence of an opening or a through cavity reduces the performance of the acoustic panel by reducing the functional surface of said panel. On the other hand, the opening or the through cavity causes discontinuities in the acoustic treatment, so-called "splices", which will modify the structure of the acoustic field by repelling the energy that propagates through the acoustic panel. Thus, the drop in acoustic performance is much greater than the drop in performance due solely to the loss of acoustic functional surface.

Furthermore, such openings or cavities in the acoustic panel can lead to problems of sealing of the acoustic panel.

SUMMARY OF THE INVENTION

This invention thus has the main aim of remedying the aforementioned drawbacks.

In accordance with the invention, this aim is achieved using an acoustic assembly comprising a multicellular acoustic panel having at least one through cavity along a direction X, characterized in that the acoustic assembly further comprises at least one sealing element comprising a body enclosing one or more acoustic cells, the body being able to be inserted into the cavity and extending along the direction X between a first face and a second face, the sealing element further comprising a seal on the second face of the body able to ensure the sealing with the acoustic panel. The seal is also able to ensure the retainment of the sealing element in the acoustic panel.

Thus, the use of a sealing element with acoustic attenuation properties makes it possible to minimize the impact of the through cavity or cavities on the overall performance of the assembly. Specifically, the sealing element greatly reduces the acoustic functional surface loss and does not give rise to any significant irregularities in the structure of the overall acoustic field. The seal makes it possible to ensure the retainment of the sealing element in the acoustic panel, while also ensuring the sealing of the acoustic panel.

The sealing element can be easily removed if necessary, to access attaching structures or systems located behind the acoustic panel, and can then be replaced.

According to a particular feature of the invention, the body of the sealing element fits the shape of the cavity when it is inserted into said cavity.

According to a particular feature of the invention, the seal of the sealing element is deformable between a rest or sealing position, wherein the seal extends beyond the periphery of the body perpendicular to the direction X, and a mounting or dismounting position, wherein the seal does not extend beyond the periphery of the body perpendicular to the direction X.

According to another particular feature of the invention, the sealing element further comprises a passage extending from the seal and opening onto the first face of the body, configured to allow the insertion of an object able to deform the seal from its rest position into its mounting or dismounting position.

According to another particular feature of the invention, the passage comprises at least one tapped portion.

The tapping of the passage of the sealing element, in combination with the threading of the inserted object, makes it possible to facilitate the retainment of the seal in its mounting or dismounting position during handling of the sealing element. Furthermore, the tapping of the passage and the threading of the inserted object can facilitate the mounting and dismounting of the sealing element, for example making it possible to use a screw extractor.

According to another particular feature of the invention, each cell of the acoustic panel and each cell of the sealing element comprises a hollow acoustic element having a shape gradually tapering between a base and an apex.

According to another particular feature of the invention, the acoustic impedance of the acoustic cell or cells of the sealing element has a value between 90% and 110% of the value of the acoustic impedance of the cells of the acoustic panel.

According to another particular feature of the invention, the sealing element has an axial symmetry.

The axial symmetry can be along the axis X which intersects with the first surface and the second surface of the body of the sealing element at their center.

The invention further relates to a method for mounting an acoustic assembly in accordance with the invention, comprising the placing of at least one sealing element in at least one through cavity of the multicellular acoustic panel, said sealing element occupying the volume defined by the cavity such that the first face of the body of the sealing element is located in the extension of a first face of the acoustic panel and the seal of the sealing element ensures the sealing between the second face of the body of the sealing element and a second face of the acoustic panel opposite the first face of the panel.

According to a particular feature of the invention, the placing of the sealing element comprises the following steps:
   inserting an object into the passage to deform the seal from its rest or sealing position into its mounting or dismounting position,
   placing the sealing element in the cavity of the multicellular acoustic panel while retaining the seal in its mounting or dismounting position, said sealing element occupying the volume defined by the cavity such that the first face of the body of the sealing element is located in the extension of a first face of the acoustic panel,
   removing the object inserted into the passage to allow the seal to regain its rest or sealing position, such that the seal ensures the sealing between the second face of the body of the sealing element and a second face of the acoustic panel opposite the first face.

The invention further relates to a method for dismounting an acoustic assembly in accordance with the invention, comprising the removing of at least one sealing element from a through cavity of the multicellular acoustic panel by deforming the seal of said sealing element.

According to a particular feature of the invention, the removal of the sealing element comprises the following steps:
   inserting an object into the passage to deform the seal from its rest or sealing position into its mounting or dismounting position,
   removing the sealing element from the cavity of the multicellular acoustic panel while retaining the seal in its mounting or dismounting position.

The invention further relates to a method for repairing a multicellular acoustic panel comprising a damaged area, comprising the following steps:
   producing at least one through cavity along a direction X by removing the cells present at least in part in the damaged area,
   supplying at least one sealing element comprising a body enclosing one or more acoustic cells, the body fitting the shape of the cavity and extending along the direction X between a first face and a second face, the sealing element further comprising a seal on the second face,
   placing said sealing element in the through cavity, the sealing element occupying the volume defined by the cavity such that the first face of the body of the sealing element is located in the extension of a first face of the acoustic panel and the seal of the sealing element ensures the sealing between the second face of the body of the sealing element and a second face of the acoustic panel opposite the first face.

According to a particular feature of the invention, the seal of the sealing element is deformable between a rest or sealing position, wherein the seal extends beyond the periphery of the body perpendicular to the direction X, and a mounting or dismounting position, wherein the seal does not extend beyond the periphery of the body perpendicular to the direction X, and wherein the sealing element further comprises a passage extending from the seal and opening onto the first face of the body, the placing of the sealing element comprising the following steps:
   inserting an object into the passage to deform the seal from its rest or sealing position into its mounting or dismounting position,
   placing the sealing element in the cavity of the multicellular acoustic panel while retaining the seal in its mounting or dismounting position, said sealing element occupying the volume defined by the cavity such that the first face of the body of the sealing element is located in the extension of a first face of the acoustic panel,
   removing the object inserted into the passage to allow the seal to regain its rest or sealing position, such that the seal ensures the sealing between the second face of the body of the sealing element and a second face of the acoustic panel opposite the first face.

Finally, the invention relates to a sealing element comprising a body extending along a direction X between a first face and a second face and enclosing one or more acoustic cells, the first face comprising one or more acoustic skins, said sealing element further comprising a sealing cavity delimited at least by the second face of the body and by a deformable seal.

According to a particular feature of the invention, the seal is deformable between a rest or sealing position, wherein the seal extends beyond the periphery of the body perpendicular to the direction X, and a mounting or dismounting position, wherein the seal does not extend beyond the periphery of the body perpendicular to the direction X.

According to another particular feature of the invention, the sealing element further comprises a passage extending from the sealing cavity and opening onto the first face of the body, configured to allow the insertion of an object able to deform the seal from its rest position into its mounting or dismounting position.

According to another particular feature of the invention, the sealing element further comprises a stiff plate extending perpendicular to the direction X such that the sealing cavity is delimited by the second face of the body, by the deformable seal and by the stiff plate, the deformable seal connecting the edges of the stiff plate to the second face of the body.

DESCRIPTION OF THE EMBODIMENTS

Figure 2:
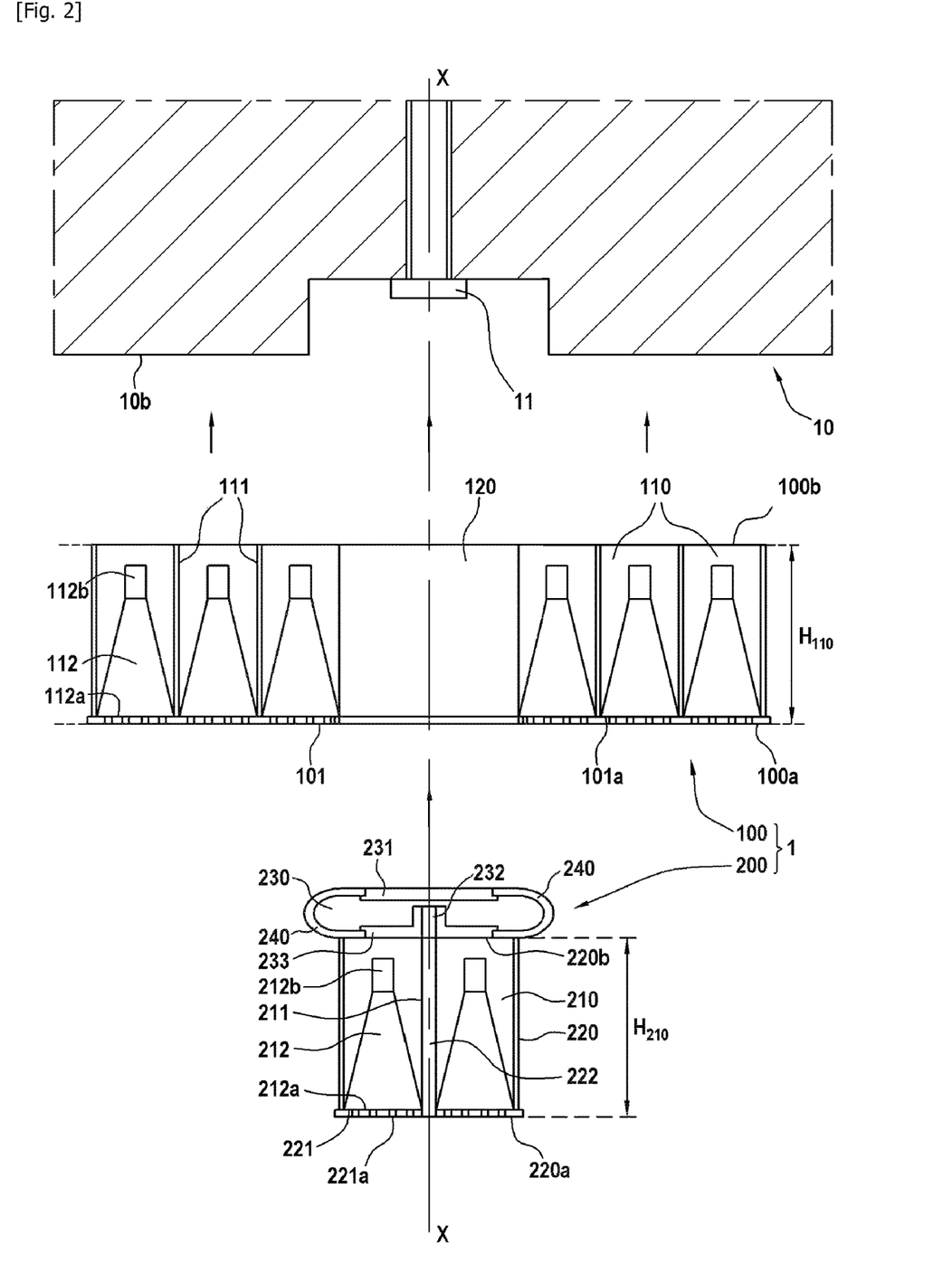
FIG. 2 is a section view illustrating an acoustic assembly according to the invention disposed against a structure in exploded view.

FIG. 2 illustrates an acoustic assembly 1 disposed against a structure 10, the acoustic assembly 1 comprising an acoustic panel 100 and one or more sealing elements 200.

In particular, FIG. 2 illustrates an acoustic panel 100 comprising a plurality of acoustic cells 110 extending along a direction X between a first face 100a of the acoustic panel 100 and a second face 100b of the acoustic panel 100 opposite the first face 100a.

The acoustic panel 100 comprises a plurality of partitions 111 extending between the first face 100a and the second face 110b of the acoustic panel, the partitions forming a network of ribs delimiting the acoustic cells 110. The height of the acoustic cells 110 is chosen such as to obtain the treatment of beneficial frequencies according to the use that will be made of the acoustic panel 100.

In the example shown in FIG. 2, the cells 110 of the acoustic panel 100 have a round section. Of course, one does not depart from the scope of the invention if the cells of the acoustic panel have a square, rectangular, hexagonal or other section, for example a structure a so-called "honeycomb" structure.

In the example described here, each acoustic cell 110 of the acoustic panel 100 has at least one complex hollow acoustic element 112 having a shape gradually tapering between a base 112a and an apex 112b. Of course, one does not depart from the scope of the invention if only a part of the acoustic cells of the acoustic panel possess such an acoustic element, or if none of the acoustic cells of the acoustic panel have such an acoustic element. Each acoustic cell that does not possess any hollow acoustic element can be solely composed of the partitions that delimit it.

In the example shown in FIG. 2, the hollow acoustic elements 112 of the acoustic panel 100 have a pyramidal shape. However, one does not depart from the scope of the invention if the hollow acoustic elements of the acoustic panel for example have a conical, spiral or funnel shape. In the example shown in FIG. 2, the hollow acoustic elements 112 of the acoustic panel 100 has rotational symmetry. However, one does not depart from the scope of the invention if the hollow acoustic elements are asymmetrical.

Preferably, the hollow acoustic elements 112 of the acoustic panel 100 have a thickness less than 1 mm, for example between 0.3 mm and 0.5 mm. Preferably, the base 112a of the hollow acoustic elements 112 is contained in a circle, the diameter of which is between 5 mm and 50 mm. For example, the base 112a of the hollow acoustic elements 112 is contained in a circle of 32 mm in diameter. Preferably, the height $H_{110}$ of the acoustic cells 110 is between 5 mm and 100 mm. For example, the height $H_{110}$ of the acoustic cells 110 is of 65 mm.

The first face 100a of the acoustic panel 100 is covered by an upper acoustic skin 101. The upper acoustic skin 101 has the function of allowing the passage of the sound waves to be attenuated inside the acoustic panel 100. For this purpose, the acoustic skin 101 comprises a plurality of perforations 101a in the example described in FIG. 2. The acoustic skin 101 can be made of composite material, for example carbon fiber-based.

The acoustic panel 100 can be made in a well-known manner out of polymer, composite or metallic material, by additive manufacturing or according to conventional means.

In the example shown in FIG. 2, the direction X in which the acoustic cells 110 extend is perpendicular to the first face 100a and to the second face 100b of the acoustic panel 100. Of course, one does not depart from the scope of the invention if the direction along which the acoustic cells are directed is inclined, i.e. is not perpendicular to the first face or to the second face of the acoustic panel.

The second face 100b of the acoustic panel 100 can be covered by a closing skin, intended to reflect the sound waves entering into the cells 110 of the acoustic panel 100, particularly in the case where the second face 100b of the acoustic panel 100 is not disposed against a structure.

The second face 100b of the acoustic panel 100 can be disposed against or near the surface 10b of a structure 10, for example an airplane engine, an air inlet or a reverser, as in the example described in FIG. 2. The acoustic panel 100 may correspond to one of the panels 81, 82 or 83 described in relation to FIG. 1. Of course, one does not depart from the scope of the invention if the acoustic panel is used for a structure which is not an airplane engine, or even a structure which is not a turbomachine. Thus, the second face 100b of the acoustic panel 100 preferably fits the shape of the surface 10b of the structure 10, which can be non-planar. The structure 10 may comprise portions or elements on its surface 10b to which it is necessary to have access, for example attaching screws 11.

For this purpose, one or more through cavities 120 oriented along the direction X are present in the acoustic panel 100, the through cavity or cavities 120 extending between the first face 100a and the second face 100b of the acoustic panel 100. Preferably, these through cavities 120 are placed such as to allow access to portions or to elements of the surface 10b of the structure 10, for example to attaching screws 11 as illustrated in FIG. 2. Preferably, the walls of the through cavities 120 correspond to the outer partitions of acoustic cells 110 of the acoustic panel 100, i.e. none of the acoustic cells 110 or of the partitions 111 of the acoustic panel 100 is "cut off" or truncated by a through cavity 120. Thus, preferably, the cavity or cavities 120 extend in the same direction as the acoustic cells 110 of the acoustic panel 100.

The acoustic assembly 1 illustrated in FIGS. 2 to 6 comprises, in addition to the acoustic panel 100, one or more sealing elements 200. The number of sealing elements 200 can be equal to the number of through cavities 120 of the acoustic panel 100. To simplify the figures and improve their legibility, the acoustic cells 110 of the acoustic panel 100 are not shown in FIGS. 3 to 6.

Each sealing element 200 comprises a body 220, the shape of which fits the shape of the through cavity 120 into which it is configured to insert itself. The body 220 can be made of thermoplastic material, for example by additive manufacturing or thermoplastic injection. Of course, one does not depart from the scope of the invention if the outer shape of the body is not complementary to the through cavity, as long as the insertion of the body into said cavity is permitted by the outer geometry of the body and by the inner geometry of the cavity.

The body 220 of the sealing element 200 encloses two acoustic cells 210 extending along the direction X between a first face 220*a* of the body 220 and a second face 220*b* of the body 220 opposite the first face 220*a*. The acoustic cells 210 are delimited by partitions 211 extending between the first face 220*a* and the second face 220*b* of the body 220.

In the example shown in FIGS. 2 to 6, the cells 210 of the sealing element 200 have a round section. Of course, one does not depart from the scope of the invention if the cells of the sealing element have a square, rectangular, hexagonal or other shape, for example a so-called "honeycomb" structure. Preferably, the acoustic cells 210 of the sealing element 200 have a geometry identical to those of the acoustic cells 110 of the acoustic panel 100.

In the example described here, each acoustic cell 210 of the sealing element 200 possesses at least one complex hollow acoustic element 212 having a shape gradually tapering between a base 212*a* and an apex 212*b*. Of course, one does not depart from the scope of the invention if only a part of the acoustic cells of the sealing element have such an acoustic element, or if none of the acoustic cells of the sealing element have such an acoustic element. Preferably, if the acoustic panel 100 has hollow acoustic elements 212, the sealing element 200 also has hollow acoustic elements 212.

In the example shown in FIGS. 2 to 6, the hollow acoustic elements 212 of the sealing element 200 have a pyramidal shape. However, one does not depart from the scope of the invention if the hollow acoustic elements have for example a conical, spiral or funnel shape. In the example shown in FIGS. 2 to 6, the hollow acoustic elements 112 of the sealing element 200 have rotational symmetry. However, one does not depart from the scope of the invention if the hollow acoustic elements are asymmetrical. Preferably, the hollow acoustic elements 212 of the sealing element 200 have a geometry identical to those of the hollow acoustic elements 112 of the acoustic panel 100.

Preferably, the hollow acoustic elements 212 of the sealing element 200 have a thickness of less than 1 mm, for example between 0.3 mm and 0.5 mm. Preferably, the base 212*a* of the hollow acoustic elements 212 is contained in a circle, the diameter of which is between 5 mm and 50 mm. For example, the base 212*a* of the hollow acoustic elements 112 is contained in a circle of 32 mm in diameter. Preferably, the height $H_{210}$ of the acoustic cells 210 is between 5 mm and 100 mm. For example, the height $H_{210}$ of the acoustic cells 210 is of 60 mm.

Preferably, the value of the impedance of the acoustic cells 210 of the sealing element 200 is identical or near to the value of the impedance of the acoustic cells 110 of the acoustic panel 100. In particular, the acoustic impedance of the acoustic cells 210 of the sealing element 200 has a value between 90% and 110% of the value of the acoustic impedance of the cells 110 of the acoustic panel 100. Consequently, the height and the geometry of the acoustic cells 210 of the sealing element 200, the presence of otherwise of complex hollow acoustic elements 212 in said cells 210 and, where applicable, the features of said complex hollow acoustic elements 212, are chosen such as to obtain an impedance similar to that of the cells 110 of the acoustic panel 100. For example, in the case where the acoustic panel does not have any complex hollow acoustic elements, but the acoustic cells of the sealing element are less high than those of the acoustic panel, it may be beneficial to add complex hollow acoustic elements in the acoustic cells of the sealing element in order to obtain a similar acoustic impedance between the cells of the acoustic panel and the cells of the sealing element.

The first face 220*a* of the body 220 comprises one or more upper acoustic skins 221, such that each acoustic cell 210 of the sealing element 200 is covered by an upper acoustic skin 221. The upper acoustic skin 221 has the function of allowing the passage the sound waves to be attenuated inside the body 220 of the sealing element 200. For this purpose, the acoustic skin 221 comprises a plurality of perforations 221*a* in the example described in FIGS. 2 to 6. The upper acoustic skin 221 can be made of composite material, for example carbon fiber-based.

The body 220 of the sealing element 200 further comprises a passage 222 extending along the direction X of the first face 220*a* of the body 220 to the second face 220*b* of the body 220. The passage 222 is preferably located at the center of the body 220, i.e. it connects the center of the first face 220*a* to the center of the second face 220*b*. The passage 222 is preferably located between the acoustic cells 210 of the sealing element 200. The passage 222 can be tapped. The passage 222 can be cylindrical and can have a section of a diameter between 3 mm and 10 mm, preferably of 5 mm.

The passage 222 opens onto the first face 220*a* of the body 220, preferably over a portion of the first face 220*a* which is not covered by an upper acoustic skin 221, and over the second face 220*b* of the body 220.

The sealing element 200 comprises, in addition to the body 220, a sealing cavity 230 extending from the second face 220*b* of the body 220. The passage 222 opens into the sealing cavity 230. The sealing cavity 230 is delimited at least by the second face 220*b* of the body 220 and by the deformable retaining seal 240. As illustrated in FIGS. 2 to 6, the sealing cavity 230 is delimited by the second face 220*b* of the body 220, by a deformable sealing and retaining seal 240 and by a stiff plate 231. The stiff plate 231 can be made of plastic.

The stiff plate 231 extends perpendicular to the direction X and at a non-zero variable distance from the second face 220*b* of the body 220. The surface area of the stiff plate 231 is less than the surface area of the second face 220*b* of the body 220. Preferably, the stiff plate 231 has a reduced thickness along X and extends perpendicular to X over a round or oblong surface.

The deformable seal 240 closes the sealing cavity 230 by joining the edges of the stiff plate 231 to the second face 220*b* of the body 220. The deformable seal 240 can form a curve between the edges of the stiff plate 231 and the second face 220*b* of the body 220, the radius of which can be between 5 mm and 10 mm, preferably 8 mm.

The rigid plate 231 and the seal 240 can form a single part. The stiff plate 231 can also be absent from the sealing element, the deformable seal then also playing the role of the stiff plate, on the condition that the seal is sufficiently reinforced in its part located above the center of the second face 220b of the body 220.

The deformable seal 240 can be attached to the second face 220b of the body 220 by means of an attaching plate 233. The attaching plate 233 is attached to the second face 220b of the body 220 and extends perpendicular to the direction X. The surface area of the attaching plate 233 is less than the surface area of the second face 220b of the body 220 and the attaching plate 233 extends over the second face 220b without reaching the periphery of said second face 220b. The deformable seal 240 can thus be attached to the second face 220b of the body 220 while being present between the second face 220b and the end of the attaching plate 233.

The attaching plate 233 comprises at its center an orifice 232 located in the extension of the passage 222 of the body 220, in order to allow the passage of an object through the attaching plate 233. The orifice 232 can be tapped. If the passage 222 is tapped, the same tapping features are used for the orifice 232. The portion of the attaching plate 233 located around the orifice 232 can extend toward the inside of the cavity 230, in order to ensure better guiding of any object inserted inside the passage 222 and inside the orifice 232.

The attaching plate 233 can be made of plastic or made of metal.

If the sealing element 200 does not comprise any attaching plate, the passage 222 of the body 220 opens directly into the sealing cavity 230.

The seal 240 is deformable between a first position, the so-called rest or sealing position, and a second position, the so-called mounting or dismounting position.

In its first position, the seal 240 extends perpendicular to the direction X beyond the periphery of the body 220. Thus, if one virtually extends the outer lateral surface of the body 220 in the direction X by fictitious walls delimiting a virtual portion, the seal 240 will extend beyond this virtual portion. When the seal 240 is in its first position, the stiff plate 231 is located at a reduced distance $d_1$ from the second face 220b of the body 220.

In its second position, the seal 240 extends perpendicular to the direction X, but not beyond the periphery of the body 220. Thus, if one virtually extends the outer lateral surface of the body 220 in the direction X by fictitious walls delimiting a virtual portion, the seal 240 will extend solely inside this virtual portion. When the seal 240 is in its second position, the stiff plate 231 is located at a distance $d_2$ from the second face 220b of the body 220. When the seal 240 is in its second position, the stiff plate 231 is located at a distance $d_2$ from the second face 220b greater than the distance $d_1$ within which the plate 231 is located when the seal 240 is in its first position.

The seal 240 must be made of a material allowing its deformation from the first to the second position, and conversely, for example a silicone or fluorosilicone elastomer, reinforced or not. The seal 240 must be made of a material suitable for the temperature to which said seal will be exposed.

According to a particular embodiment of the invention, the sealing element has at least an axial symmetry. In the example shown in FIGS. 2 to 6, the sealing element 200 has asymmetry with respect to the axis X. Thus, the sealing element 200 can be inserted into the through cavities 120 along two different orientations. The change from one orientation to the other is made by making a rotation of 180° about the axis X.

There will now follow a description of a method for dismounting the acoustic assembly making it possible to separate the sealing element or elements from the acoustic panel. Such a method can in particular make it possible to access elements located behind the acoustic panel. For example, the removal of the sealing element 200 can make it possible to access an attaching screw 11 located behind the acoustic panel 100 in accordance with the example illustrated in FIG. 2.

Figure 3:
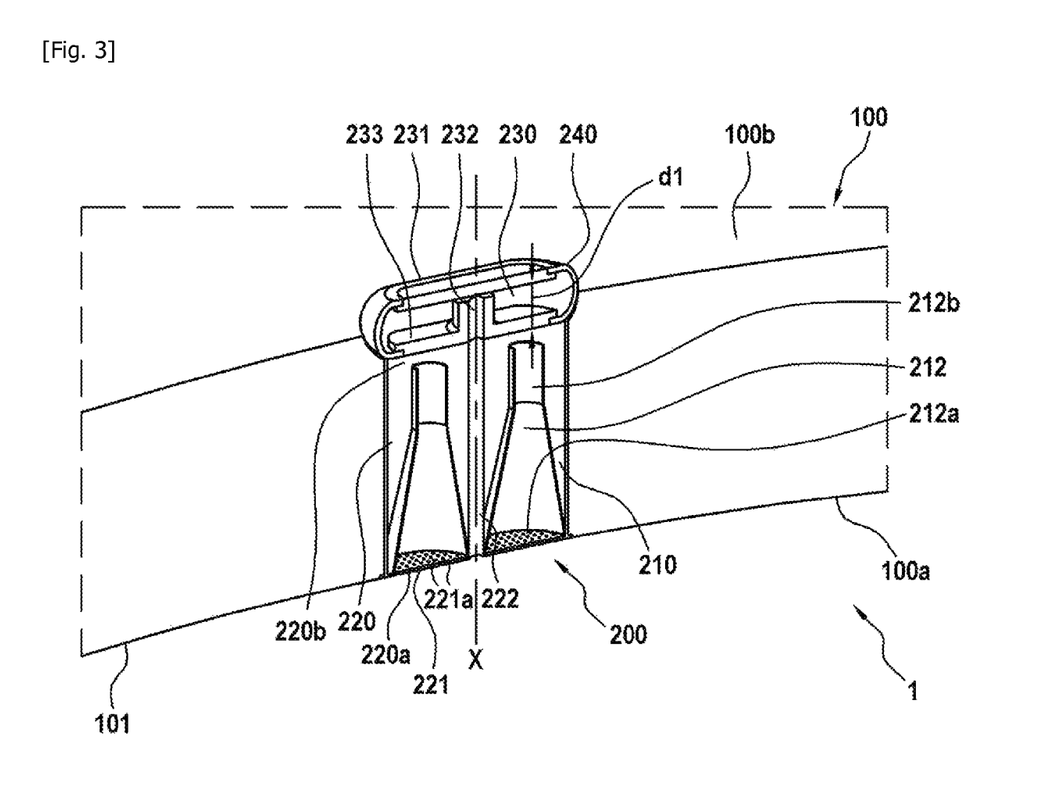
FIG. 3 is a 3D section view illustrating a sealing element when the seal is in the sealing position, the sealing element being inserted into an acoustic panel in accordance with the invention.

FIG. 3 illustrates the sealing element 200 inserted into a through cavity 120 of the acoustic panel 100. In this configuration, the seal 240 of the sealing element 200 is in its first position, the so-called sealing or rest position, and ensures the sealing between the sealing element 200 and the second face 100b of the acoustic panel 100. The first face 220a of the body 220 of the sealing element 200 is located in the extension of the first face 100a of the acoustic panel 100. Thus, in this configuration, the sealing element 200 ensures the sealing with the second face 100b of the acoustic panel 100 and allows an acoustic attenuation of all the sound waves directed toward the first, relatively uniform face of the assembled acoustic assembly 1, which comprises the first face 100a of the acoustic panel 100 and the first face 220a of the body 220 of the sealing element 200. Consequently, the sealing element 200 ensures good acoustic performance of the assembled acoustic assembly 1 despite the through cavities 120 present in the acoustic panel 100.

Figure 4:
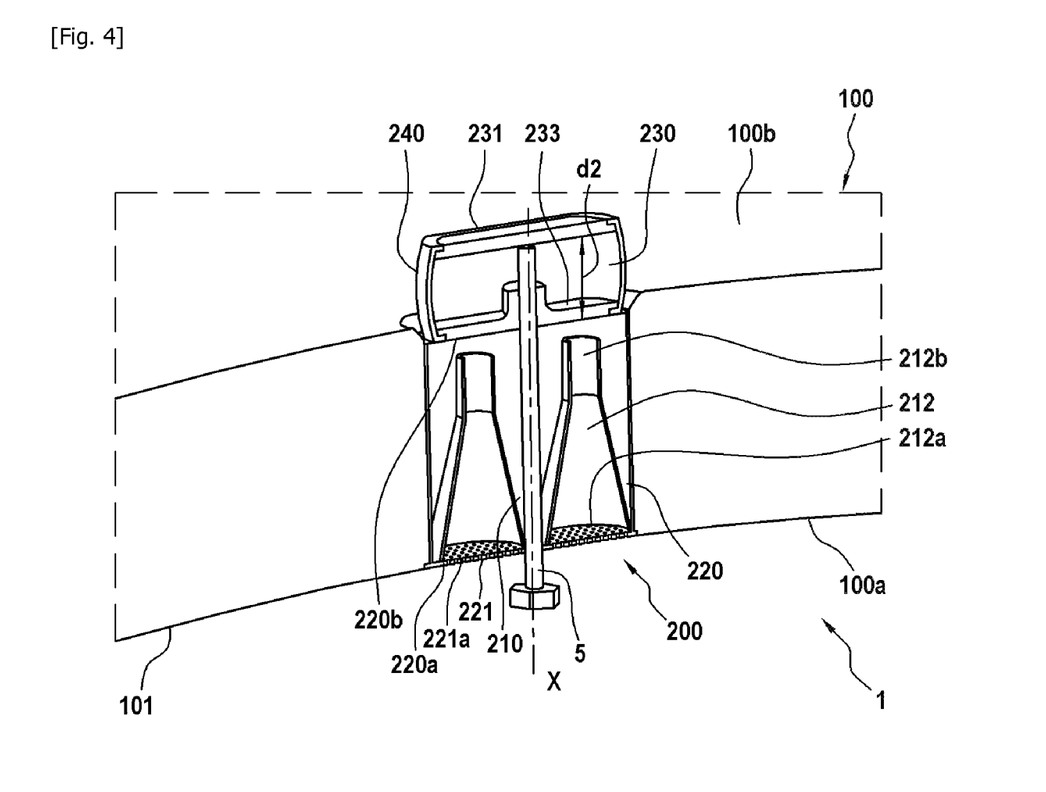
FIG. 4 is a 3D section view illustrating the sealing element of FIG. 3 when the seal is in the mounting or dismounting position, the sealing element being inserted into an acoustic panel.

To proceed to the removal of the sealing element or elements 200, an object 5 is inserted into the passage 222 of the body 220 and, if an attaching plate 233 is present in the sealing cavity 230, inside the orifice 232 of the attaching plate 233, as illustrated in FIG. 4. The object 5 is inserted from the first face 220a of the body 220 of the sealing element 200 all the way to the inside of the sealing cavity 230.

The inserted object 5 then pushes against the rigid plate 231, to increase the distance between the rigid plate 231 and the second face 220b of the body 220. If the sealing element does not include any stiff plate 231, the inserted object can push directly on the seal 240, on the condition that it is resistant enough.

Under the action of the inserted object 5, the deformable seal 240 gradually stretches between the stiff plate 231 and the second face 220b of the body 220 until it reaches its second, so-called mounting or dismounting position, illustrated in FIG. 4. Thus, the seal 240 no longer ensures the sealing with the second face 220b of the body 220 and no longer extends beyond the periphery of the second face 220b. In this second position, the deformable seal 240 is able to traverse the acoustic panel 100, i.e. to pass inside the through cavity 120 into which the sealing element 200 is inserted.

The inserted object 5 can be a stiff rod, which can be threaded, at least in part. The object 5 can be a screw. Preferably, the threading of the object 5 is adapted to the tapping of the passage 222 of the body 220 and of the orifice 232 of the attaching plate 233 if these latters are tapped. The object 5 must have enough length to allow the deformation of the seal from its first position into its second position. Thus, the object 5 can have a length of a value between 150% and 250% of the length of the body 220 of the sealing element 200 in the direction X. The object 5 may comprise a volume at its end opposite the end that is inserted into the sealing element 200, to make it easier to pick up.

When the seal 240 is deformed into its second, so-called mounting or dismounting position, the sealing element 200 can be removed from the acoustic panel 100. To avoid damaging the seal 240, the pressure of the object 5 on the stiff plate 231 must be maintained during the removal of the sealing element 200. This pressure can be maintained manually, or by means of the threading of the object 5 and of the tappings of the passage 222 and/or of the orifice 232.

Figure 5:
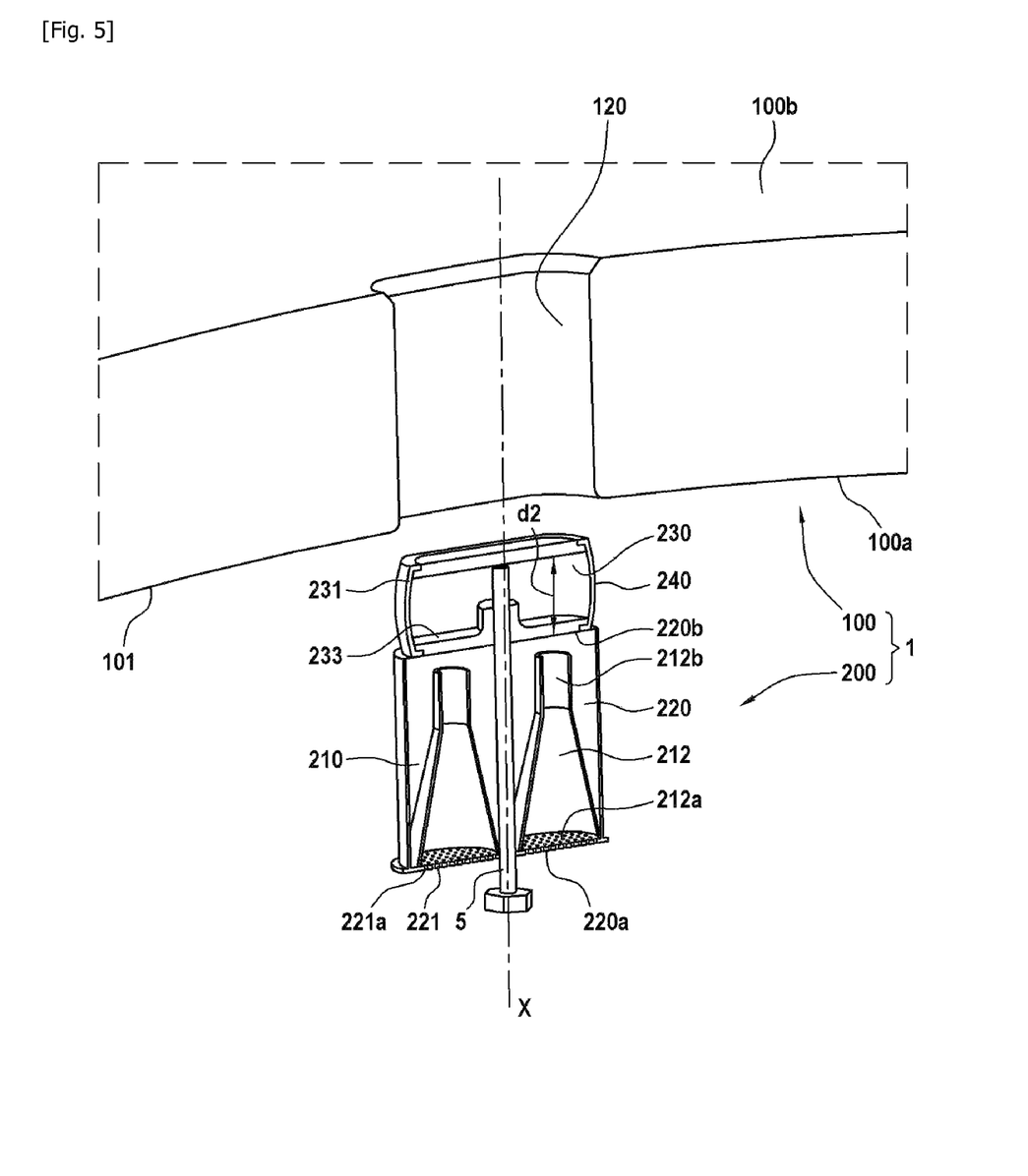
FIG. 5 is a 3D section view illustrating the sealing element of FIGS. 3 and 4 when the seal is in the mounting or dismounting position, the sealing element being removed from the acoustic panel.
Figure 6:
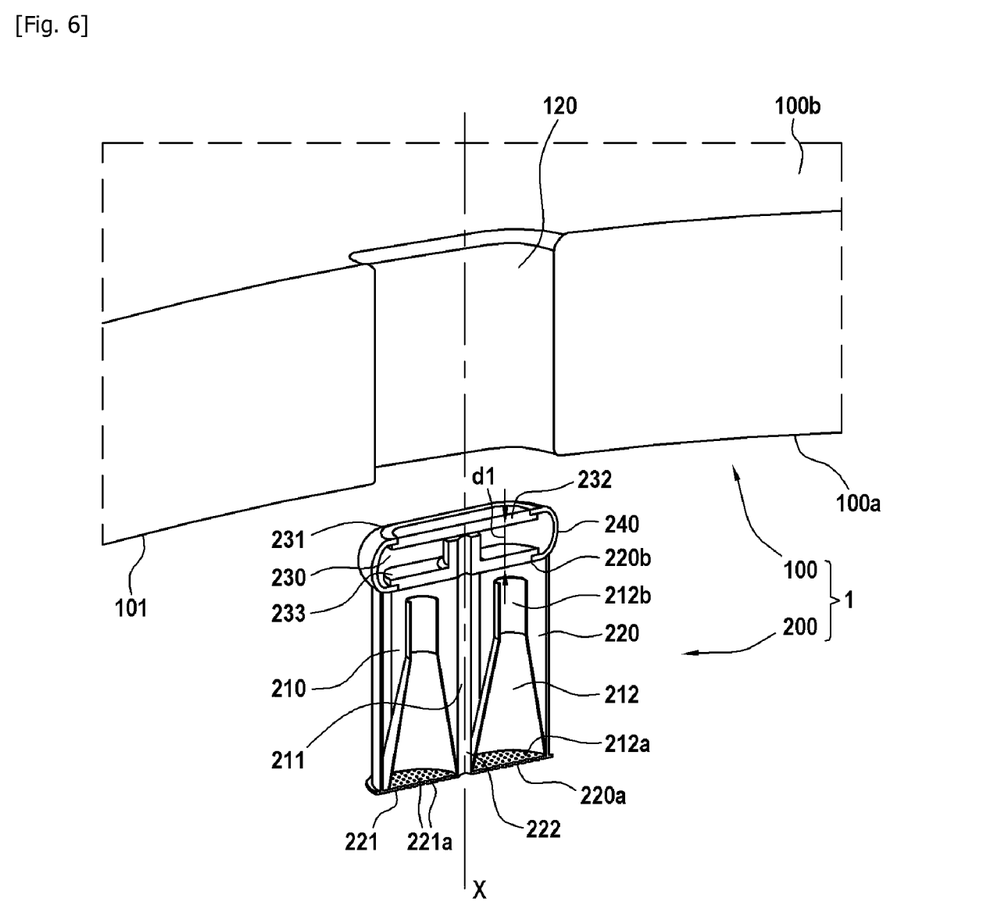
FIG. 6 is a 3D section view illustrating the sealing element of FIGS. 3, 4 and 5 when the seal is in the rest position, the sealing element being removed from the acoustic panel.

When the sealing element 200 is removed, the seal 240 can be retained in the second position by the object 5, as illustrated in FIG. 5, or can regain its position by at least partly removing the object 5, as illustrated in FIG. 6.

There will now follow a description of a method for mounting the acoustic assembly making it possible to insert the sealing element or sealing elements into the acoustic panel. Such a method can in particular make it possible to plug the through cavities present in the acoustic panel, which do not make it possible to attenuate the soundwaves, by a sealing element capable of attenuating the soundwaves.

FIG. 6 illustrates the sealing element 200 separated from the acoustic panel 100, which comprises an empty through cavity 120. In this configuration, the seal 240 of the sealing element 200 is in its first, so-called sealing or rest position.

To proceed to the insertion of the sealing element or sealing elements 200 into the acoustic panel 100, an object 5 is inserted into the passage 222 of the body 220 and, if an attaching plate 233 is present in the sealing cavity 230, into the orifice 232 of the attaching plate 233, as illustrated in FIG. 5. The object 5 is inserted from the first face 220*a* of the body 220 of the sealing element 200 all the way to the inside of the sealing cavity 230.

The inserted object 5 then pushes against the stiff plate 231, to increase the distance between the stiff plate 231 and the second face 220*b* of the body 220. If the sealing element does not include any stiff plate 231, the inserted object can push directly on the seal 240, as long as it is resistant enough.

Under the action of the inserted object 5, the deformable seal 240 gradually stretches between the stiff plate 231 and the second face 220*b* of the body 220 until it reaches it second, so-called mounting or dismounting position, illustrated in FIG. 5. In this second position, the deformable seal 240 is able to traverse the acoustic panel 100, i.e. to go from the inside of the through cavity 120 to allow the insertion of the sealing element 200 into the acoustic panel 100.

The object 5 can have the same features as previously. In the example shown FIGS. 3 to 6, the object inserted into the body 220 of the sealing element 200 is identical for the mounting and the dismounting. Of course, one does not depart from the scope of the invention if different elements are used to deform the seal for the mounting and the dismounting.

When the seal 240 is deformed into its second, so-called mounting or dismounting position, the sealing element 200 can be inserted into the acoustic panel 100, as illustrated in FIG. 4. To avoid damaging the seal 240, the pressure of the object 5 on the stiff plate 231 must be maintained during the insertion of the sealing element 200. This pressure can be maintained manually, or by means of the threading of the object 5 and the tappings of the passage 222 and/or of the orifice 232.

When the sealing element 200 is put in place in the through cavity 120 of the acoustic panel 100, the inserted object 5 is removed. The sea 240 thus regains its first, so-called sealing or rest position. In this configuration, the first face 220*a* of the body 220 of the sealing element 200 is located in the extension of the first face 100*a* of the acoustic panel 100. Thus, in this configuration, the sealing element 200 ensures the sealing with the second face 100*b* of the acoustic panel 100 and allows an acoustic attenuation of all the soundwaves directed toward the first relatively uniform face of the assembled acoustic assembly 1, which comprises the first face 100*a* of the acoustic panel 100 and the first face 220*a* of the body 220 of the sealing element 200. Consequently, the sealing element 200 provides a good acoustic performance of the assembled acoustic assembly 1 despite the through cavities 120 present in the acoustic panel 100.

Figure 7:
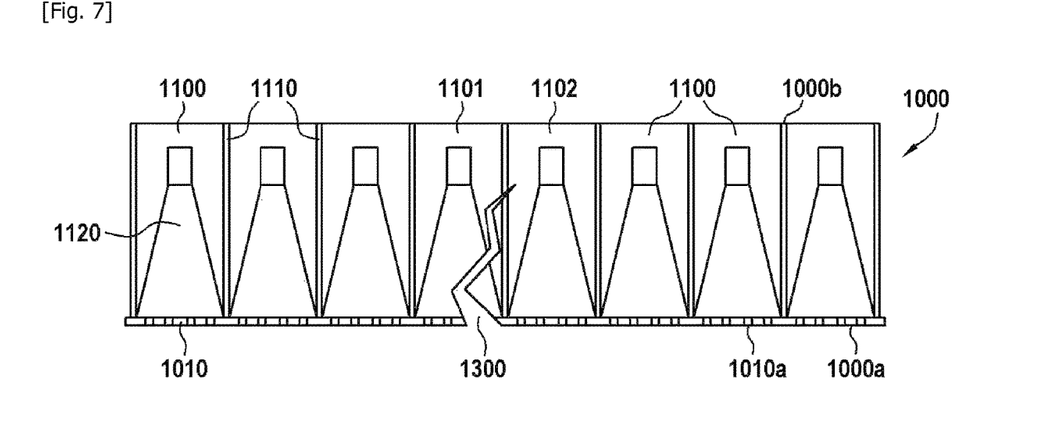
FIG. 7 is a section view of an acoustic panel having a damaged area.

There will now follow a description of a method for repairing an acoustic panel making it possible to replace a damaged area of said acoustic panel. FIG. 7 illustrates for example an acoustic panel 1000 comprising a plurality of acoustic cells 1100, two adjacent cells 1101 and 1102 of which have been undergone a damage 1300. The acoustic cells 1100 are delimited by partitions 1110 and extend between a first face 1000*a* of the acoustic panel 1000 and a second face 1000*b* of the acoustic panel 1000 opposite the first face 1000*a*. In the example shown, the acoustic cells 1100 comprise complex hollow acoustic elements 1120. The first face 1000*a* of the acoustic panel 1000 is covered by an upper acoustic skin 1010, which comprises a plurality of perforations 1010*a*. The acoustic panel 1000 can have all the features and variations previously described in the context of the example of the acoustic panel 100.

Figure 8:
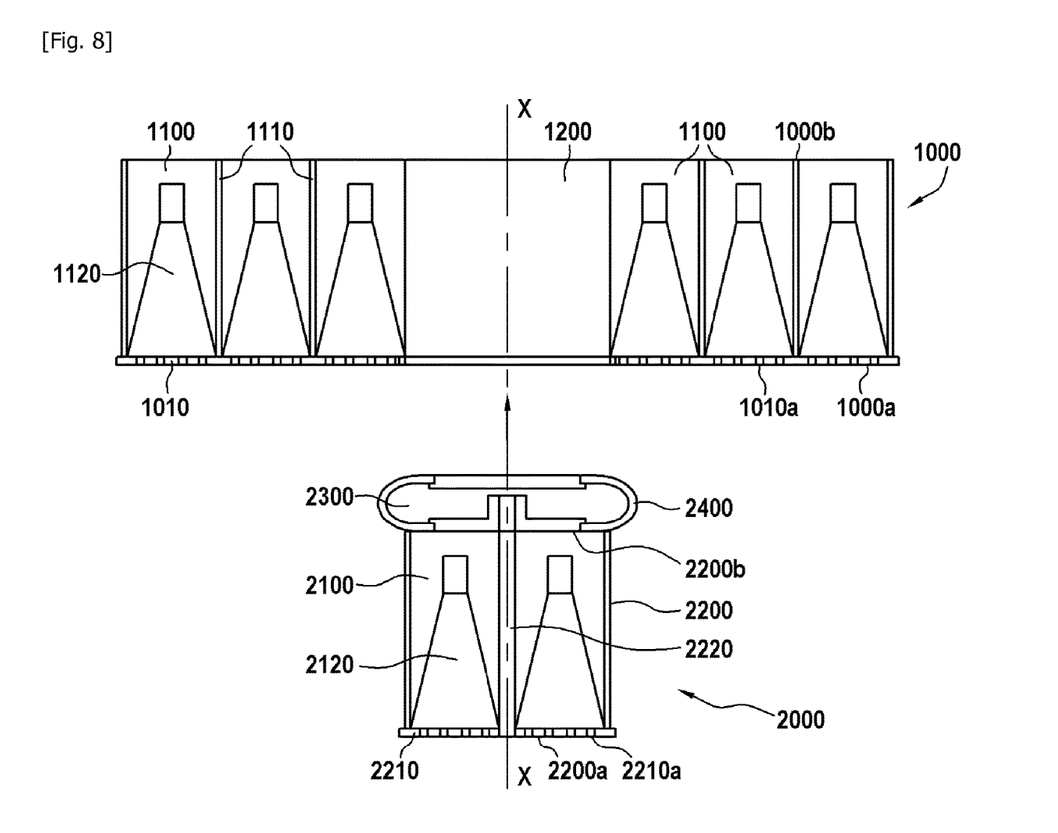
FIG. 8 is a section view of an acoustic assembly in accordance with the invention, which comprises the acoustic panel of FIG. 6 wherein the damaged area has been removed and a sealing element.

A through cavity 1200 is made along a direction X in the acoustic panel 1000, by removing the acoustic cells 1101 and 1102 which were at least partly damaged, as illustrated in FIG. 8. This is because it is more beneficial from an acoustic point of view to remove complete acoustic cells, to be able to replace them with other acoustic cells.

A sealing element 2000 is used to fill the through cavity 1200 thus formed, the shape of the body 2200 of which fits the geometry of said through cavity 1200. Preferably, the acoustic impedance of the sealing element 2000 is globally equivalent to the acoustic impedance of the area of the acoustic panel 1000 that has been removed.

In the example illustrated in FIG. 8, two acoustic cells 1101 and 1102 have been removed from the acoustic panel 1000. Thus, to obtain a similar acoustic impedance, the sealing element 2000 also encloses two acoustic cells 2100 extending along the direction X between a first face 2200*a* of the body 2200 and a second face 2200*b* of the body 2200.

The acoustic cells 2100 comprise complex hollow acoustic elements 2120 having a shape gradually tapering between a base and an apex.

The first face 2200*a* of the body 2200 is covered by one or more upper acoustic skins 2210, such that each acoustic cell 2100 of the sealing element 2000 is covered by an upper acoustic skin 2210, which comprises a plurality of perforations 2210*a*.

The body 2200 of the sealing element 2000 further comprises a passage 2220, which can have all the features, functions and variations previously described. The sealing element 2000 further comprises a cavity 2300 delimited at least in part by a seal 2400, these latters being able to have all the features, functions and variations described previously.

The sealing element 2000 can then be inserted into the acoustic panel 1000 according to the mounting method described previously, by deforming the seal 2400.

Figure 9:
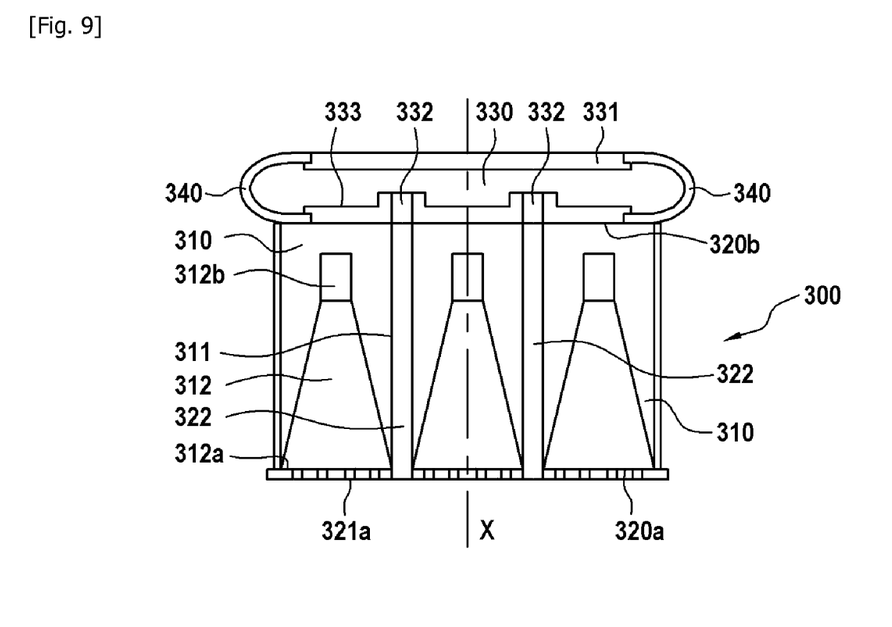
FIG. 9 is a section view of a sealing element comprising three acoustic cells aligned in accordance with the invention.
Figure 10:
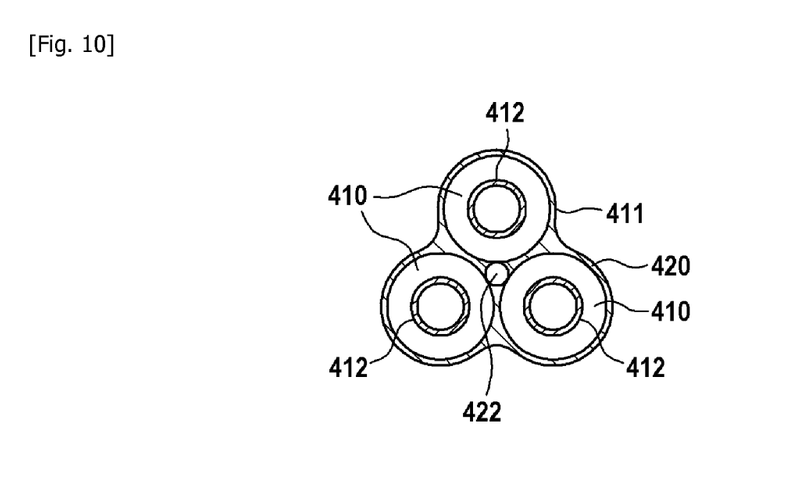
FIG. 10 is a section view of a sealing element comprising three acoustic cells placed in a "triangle" in accordance with the invention.

In the examples shown previously, the body of the sealing element encloses only two acoustic cells. Of course, one does not depart from the scope of the invention if the sealing element is adapted to enclose more than two acoustic cells, as illustrated in FIGS. 9 and 10. The shape of the deformable seal and of the plates is adapted, and the number of passages can be increased.

In a first example, if the sealing element encloses several acoustic cells aligned in a row or if the sealing element is of large dimensions, the number of passages can be increased to ensure the correct deformation of the seal between its first position and its second position. For example, FIG. 9 illustrates a sealing element 300 comprising a body 320 enclosing three acoustic cells 310 delimited by partitions 311 extending along a direction X between a first face 320a of the body 320 and a second face 320b of the body 320. The acoustic cells 310 comprise complex hollow acoustic elements 312 having a shape gradually tapering between a base 312a and an apex 312b.

The first face 320a of the body 320 is covered by one or more upper acoustic skins 321, such that each acoustic cell 310 of the sealing element 300 is covered by an upper acoustic skin 321, which comprises a plurality of perforations 321a.

The body 320 of the sealing element 300 further comprises two passages 322 extending along the direction X of the first face 320a of the body 320 to the second face 320b of the body 320. Each passage 322 is located between two acoustic cells 310 such that, in each surface perpendicular to the axis X, the centers of the acoustic cells 310 and of the passages 322 are aligned. The passages 322 can be tapped. The passages 322 can be cylindrical and can have a section of a diameter between 3 mm and 10 mm, preferably of 5 mm. The passages 322 open onto the first face 320a of the body 320, preferably over a portion of the first face 320a which is not covered by an upper acoustic skin 321, and over the second face 320b of the body 320.

The sealing element 300 comprises, in addition to the body 320, a sealing cavity 330 extending from the second face 320b of the body 320. As illustrated in FIG. 9, the sealing cavity 330 is delimited by the second face 320b of the body 320, by a deformable seal 340 and by a stiff plate 331.

The stiff plate 331 and the seal 340 may have all the features and variations described previously, and their shape is elongate to adapt to the geometry of the sealing element 300.

The deformable seal 340 can be attached to the second face 320b of the body 320 by means of an attaching plate 333. The attaching plate 333 may have all the features and variations described previously, but in this example comprises two orifices 332 located in the extension of the two passages 322, to allow the passage of one or more elements through the attaching plate 333. The orifices 332 can be tapped. If the passages 322 are tapped, the same tapping features are used for the orifices 332. The portions of the attaching plate 333 located around the orifice 332 can extend toward the inside of the cavity 330, to ensure better guiding of any object inserted into the passages 322 and the orifices 332.

If the sealing element 300 does not comprise any attaching plate, the passages 322 of the body 320 open directly into the sealing cavity 330.

The deformation of the seal 340 from its first position into its second position can be done by the insertion of two separate objects, or by the insertion of a single object comprising two branches, each branch being adapted to one of the passages 322.

In a second example, if the sealing element encloses several acoustic cells which are not aligned in a row, the passage of the sealing element can be placed at the center of at least three acoustic cells to ensure the correct deformation of the seal between its first position and its second position. For example, FIG. 10 illustrates a sealing element 400 in section comprising a body 420 enclosing three acoustic cells 410 disposed in a "triangle" and delimited by partitions 411 extending between a first face and a second face of the body. The acoustic cells 410 comprise complex hollow acoustic elements 412 having a shape gradually tapering between a base and an apex.

The body 420 of the sealing element 400 further comprises a passage 420 extending from the first face to the second face of the body. The passage 420 is located between the three acoustic cells 410 such that, in each surface perpendicular to the axis of the passage 420, the center of the passage 420 is located at the center of the triangle formed by the centers of the acoustic cells 410. The passage 420 can have all the features and variations described previously.

In this example illustrated in FIG. 10, the seal will have a triangular shape.

In the examples shown previously, the body of the sealing element encloses at least two acoustic cells. Of course, one does not depart from the scope of the invention if the sealing element encloses only one acoustic cell.

Figure 11:
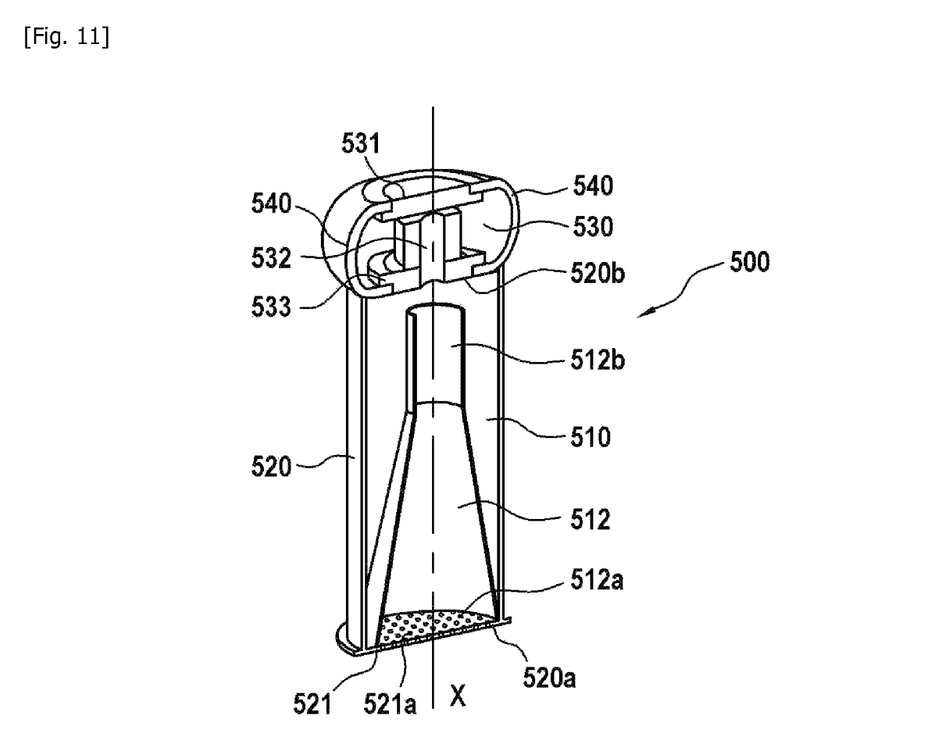
FIG. 11 is a 3D section view of a sealing element comprising a single acoustic cell in accordance with the invention.

For example, FIG. 11 illustrates a sealing element 500 comprising a body 520 enclosing a single acoustic cell 510 extending along a direction X between a first face 520a of the body 520 and a second face 520b of the body 520. The acoustic cell 510 comprises a complex hollow acoustic element 512 having a shape gradually tapering between a base 512a and an apex 512b.

The sealing element 500 comprises, in addition to the body 520, a sealing cavity 530 extending from the second face 520b of the body 520. As illustrated in FIG. 11, the sealing cavity 530 is delimited by the second face 520b of the body 520, by a deformable seal 540 and by a stiff plate 531.

The stiff plate 531 and the seal 540 may have all the features and variations described previously, and their shape is rounded to adapt to the geometry of the sealing element 500.

The deformable seal 540 can be attached to the second face 520b of the body 520 by means of an attaching plate 533. The attaching plate 533 may have all the features and variations described previously, but in this example comprises a single orifice 532, which opens on one side into the cavity 530 and on the other side into the inside of the body 520. The orifice 532 allows the passage of one or more objects through the attaching plate 533, the inserted object or objects allowing the deformation of the seal 540 between its first, so-called sealing or rest position, and its second, so-called mounting or dismounting position.

Preferably, the orifice 532 is directed along the direction X and traverses the attaching plate 533 at its center. The orifice 532 can be tapped. The orifice 532 can be cylindrical and can have a section of a diameter between 3 mm and 10 mm, preferably of 5 mm. The portions of the attaching plate 533 located around the orifice 532 may extend toward the inside of the cavity 530, to ensure better guiding of any object inserted into the orifice 532.

Preferably, the attaching plate 533 may comprise a valve at the inlet or outlet of the orifice 532, which can open due to the insertion of an object into the orifice. This valve makes it possible to plug the orifice 532 when no object is inserted into said orifice 532, such as to obtain a more controlled acoustic attenuation of the sealing element 500.

The first face 520a of the body 520 is covered by an upper acoustic skin 521, which comprises a plurality of perforations 521a. The upper acoustic skin 521 can be removable: it can be removed to allow the insertion of the object serving to deform the seal between its first and its second position, then replaced to fulfil its acoustic function. The upper acoustic skin can moreover be equipped with a perforation located in the extension of the orifice which traverses the attaching plate, of sufficient size to allow the insertion of the object serving to deform the seal between its first and its second position without needing to remove the removable acoustic skin.

The invention claimed is:

1. An acoustic assembly comprising a multicellular acoustic panel having at least one through cavity along a direction X, wherein the acoustic assembly further comprises at least one sealing element comprising a body enclosing one or more acoustic cells, the body being able to be inserted into the cavity and extending along the direction X between a first face and a second face, the sealing element further comprising a seal on the second face of the body able to ensure the sealing with the acoustic panel.

2. The acoustic assembly as claimed in 1, wherein the body of the sealing element fits the shape of the cavity when it is inserted into said cavity.

3. The acoustic assembly as claimed in claim 1, wherein the seal of the sealing element is deformable between a rest or sealing position, wherein the seal extends beyond the periphery of the body perpendicular to the direction X, and a mounting or dismounting position, wherein the seal does not extend beyond the periphery of the body perpendicular to the direction X.

4. The acoustic assembly as claimed in claim 3, wherein the sealing element further comprises a passage extending from the seal and opening onto the first face of the body, configured to allow the insertion of an object able to deform the seal from its rest position into its mounting or dismounting position.

5. The acoustic assembly as claimed in claim 4, wherein the passage comprises at least one tapped portion.

6. The acoustic assembly as claimed in claim 1, wherein each cell of the acoustic panel and each cell of the sealing element comprises a hollow acoustic element having a shape gradually tapering between a base and an apex.

7. A method for mounting an acoustic assembly as claimed claim 1, comprising the placing of at least one sealing element in at least one through cavity of the multicellular acoustic panel, said sealing element occupying the volume defined by the cavity such that the first face of the body of the sealing element is located in the extension of a first face of the acoustic panel and the seal of the sealing element ensures the sealing between the second face of the body of the sealing element and a second face of the acoustic panel opposite the first face of the panel.

8. A method for dismounting an acoustic assembly as claimed claim 1, comprising the removing of at least one sealing element from a through cavity of the multicellular acoustic panel by deforming the seal of said sealing element.

9. A method for repairing a multicellular acoustic panel comprising a damaged area, comprising the following steps:
producing at least one through cavity along a direction X by removing the cells present at least in part in the damaged area,
supplying at least one sealing element comprising a body enclosing one or more acoustic cells, the body fitting the shape of the cavity and extending along the direction X between a first face and a second face, the sealing element further comprising a seal on the second face,
placing said sealing element in the through cavity, the sealing element occupying the volume defined by the cavity such that the first face of the body of the sealing element is located in the extension of a first face of the acoustic panel and the seal of the sealing element ensures the sealing between the second face of the body of the sealing element and a second face of the acoustic panel opposite the first face.

10. The repairing method as claimed in claim 9, wherein the seal of the sealing element is deformable between a rest or sealing position, wherein the seal extends beyond the periphery of the body perpendicular to the direction X, and a mounting or dismounting position, wherein the seal does not extend beyond the periphery of the body perpendicular to the direction X, and wherein the sealing element further comprises a passage extending from the seal and opening onto the first face of the body, the placing of the sealing element in the through cavity comprising the following steps:
inserting an object into the passage to deform the seal from its rest or sealing position into its mounting or dismounting position,
placing the sealing element in the cavity of the multicellular acoustic panel while retaining the seal in its mounting or dismounting position, said sealing element occupying the volume defined by the cavity such that the first face of the body of the sealing element is located in the extension of a first face of the acoustic panel,
removing the object inserted into the passage to allow the seal to regain its rest or sealing position, such that the seal ensures the sealing between the second face of the body of the sealing element and a second face of the acoustic panel opposite the first face.

11. A sealing element comprising a body extending along a direction X between a first face and a second face and enclosing one or more acoustic cells, the first face comprising one or more acoustic skins, said sealing element further comprising a sealing cavity delimited at least by the second face of the body and by a deformable seal.

12. The sealing element as claimed in claim 11, wherein the seal is deformable between a rest or sealing position, wherein the seal extends beyond the periphery of the body perpendicular to the direction X, and a mounting or dismounting position, wherein the seal does not extend beyond the periphery of the body perpendicular to the direction X.

13. The sealing element as claimed in claim 12, further comprising a passage extending from the sealing cavity and opening onto the first face of the body, configured to allow the insertion of an object able to deform the seal from its rest position into its mounting or dismounting position.

14. The sealing element as claimed in claim 11, further comprising a stiff plate extending perpendicular to the direction X such that the sealing cavity is delimited by the second face of the body, by the deformable seal and by the stiff plate, the deformable seal connecting the edges of the stiff plate to the second face of the body.

* * * * *